Jan. 31, 1933.  W. FERRIS  1,896,052
HYDRAULIC TRANSMISSION
Filed May 19, 1930   3 Sheets-Sheet 2
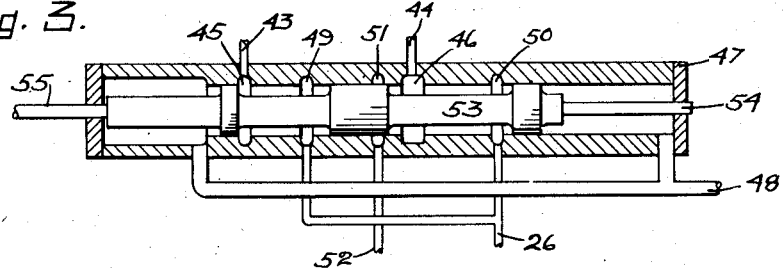
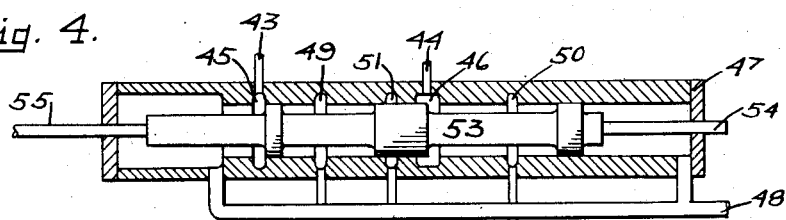
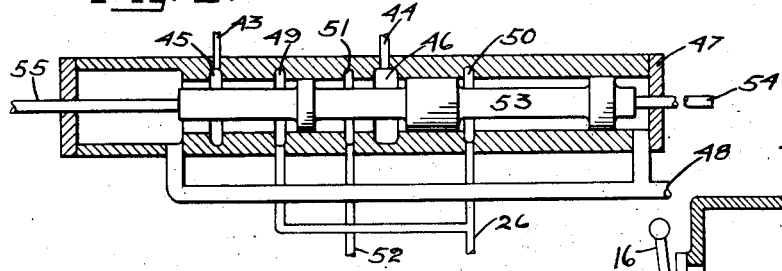
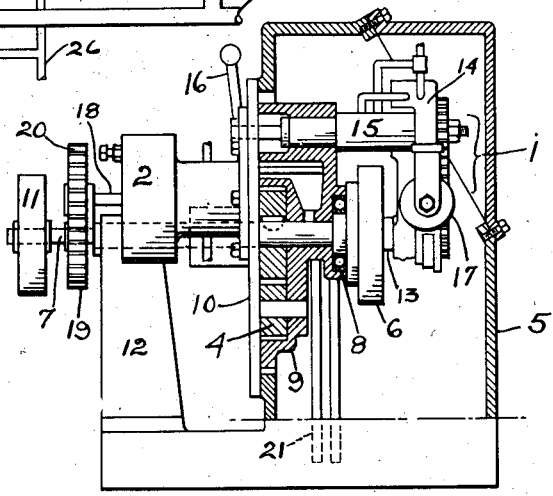
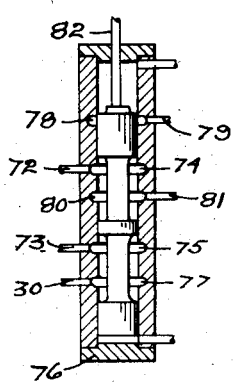
Inventor
WALTER FERRIS.
Attorney

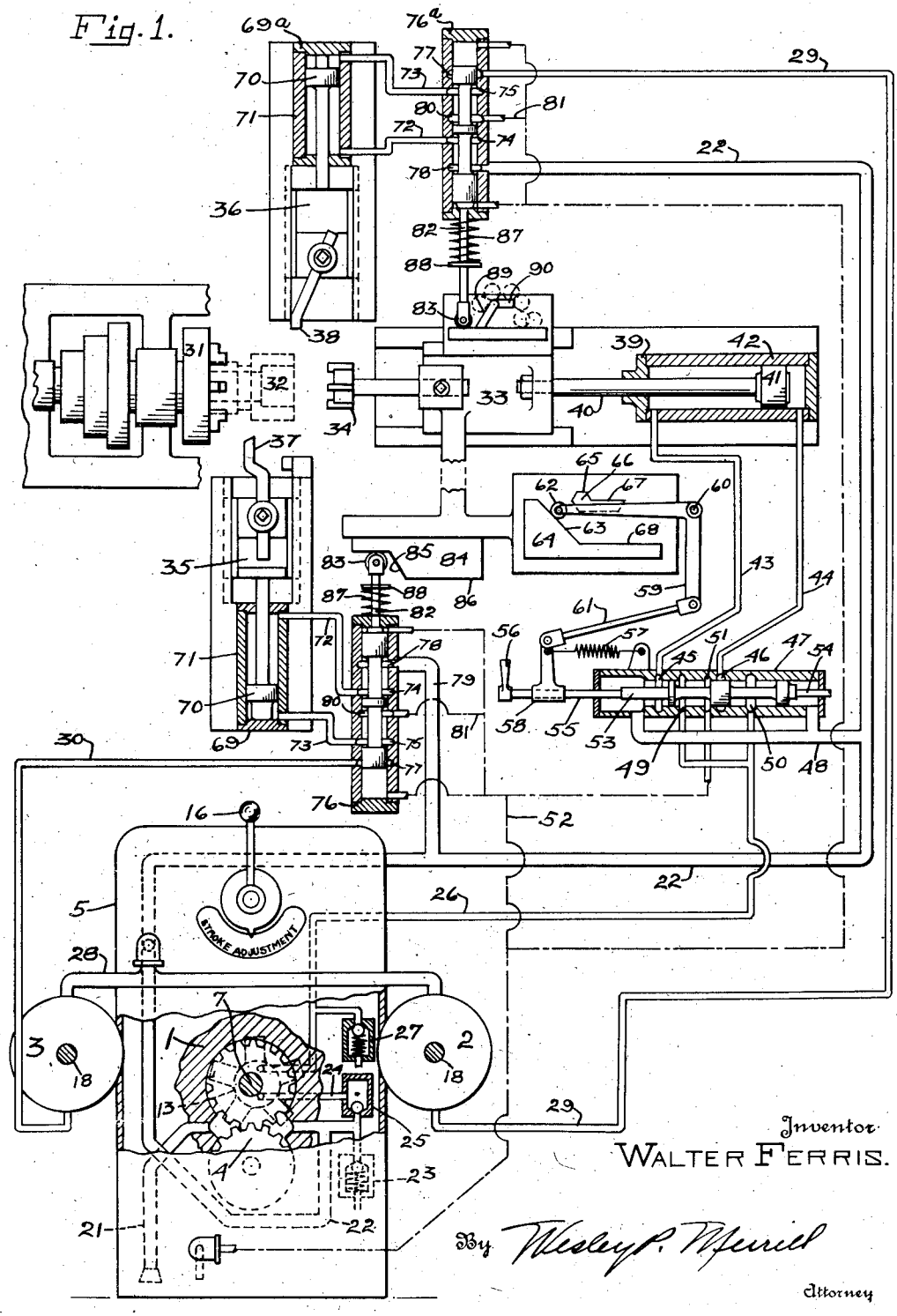

INVENTOR.
WALTER FERRIS
BY
ATTORNEY

Patented Jan. 31, 1933

1,896,052

UNITED STATES PATENT OFFICE

WALTER FERRIS, OF MILWAUKEE, WISCONSIN, ASSIGNOR TO THE OILGEAR COMPANY, OF MILWAUKEE, WISCONSIN, A CORPORATION OF WISCONSIN

HYDRAULIC TRANSMISSION

Application filed May 19, 1930. Serial No. 453,623.

This invention relates to a hydraulic transmission of the type which is employed to operate machines having a plurality of tool or work-carriers which are movable independently of each other.

The transmission to which the invention applies in particular has a number of hydraulic motors, a feed pump connected to each motor for supplying liquid thereto to operate the same, and a valve for controlling the operation of each motor.

Heretofore, it has been common practice to provide a separate auxiliary pump for supercharging each feed pump and also to direct a relatively large volume of liquid from the auxiliary pump to a motor when the same is to be operated at a high speed.

An object of the invention is to employ a single auxiliary pump for supercharging two or more feed pumps.

Another object is to employ a single auxiliary pump for supercharging two or more feed pumps and for supplying liquid to two or more hydraulic motors to operate the same at high speed.

Another object is to provide a pump unit having a unitary casing which carries two or more feed pumps and an auxiliary pump to supercharge the same.

Another object is to provide a pump unit having two or more feed pumps and an auxiliary pump which are operated by a single drive.

Another object is to provide a hydraulic transmission which is positive and precise in operation.

Other objects and advantages will appear hereinafter.

According to the invention in a general aspect, a number of feed pumps are connected to an equal number of fluid motors individually to deliver liquid thereto at predetermined volumetric rates to operate the motors at limited speeds and a single auxiliary pump is connected to all of the motors to deliver liquid thereto in larger volumes to operate the motors at higher speeds, and the auxiliary pump may also be connected to all of the feed pumps to supercharge the same.

According to the invention in another aspect, all of the pumps are carried by a single casing or housing and may be driven by a common drive.

An embodiment of the invention is shown in the accompanying drawings in which the views are as follows:

Fig. 1 is a schematic drawing showing the invention applied to a lathe having one carriage movable longitudinally thereof and two carriages movable transversely thereof, the carriages being in fully retracted position.

Fig. 2 is a side view, partly in section, of the pump unit.

Figs. 3, 4, 5 and 6 are central longitudinal sections through the control valves, showing the plungers thereof in positions to cause the lathe carriages to be moved by the motors connected thereto.

Figure 7:
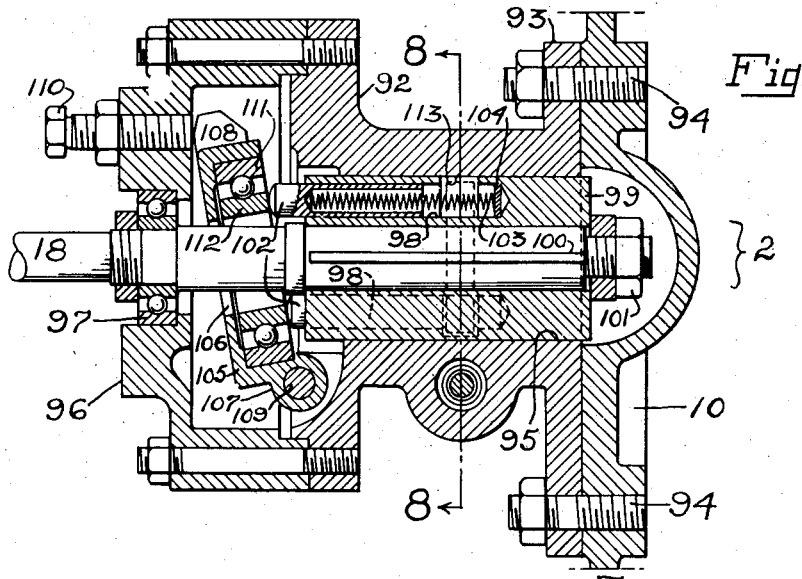
Fig. 7 is a longitudinal section through one of the secondary feed pumps shown in Figs. 1 and 2, the section being taken on the line 7—7 of Fig. 8.

The pump unit has a main feed pump 1, two secondary feed pumps 2 and 3 and an auxiliary pump 4 which are arranged in or carried by a casing 5.

A variable displacement pump which may be employed as the main feed pump 1 is illustrated and described in Patent No. 1,753,562, issued April 8, 1930 to John P. Ferris, and shown provided with a gear pump which, in suitable sizes, may be employed as an auxiliary pump 4.

The main feed pump is arranged within the casing 5 and has its pistons and cylinders arranged within and operated by a circular driver 6 which is fixed for rotation with the driving shaft 7 of the gear pump 4 and has its hub journaled in a bearing 8 carried by a bracket 9 attached to the front plate 10 of the casing 5. The shaft 7 is driven from an external source of power, as by means of a pulley 11, and is supported near its outer end by a bearing 12 carried by the base of the casing 5.

The pistons and cylinders are rotated about a pintle 13 which is eccentric to the axis of the driver 6 and supported by an arm 14 from a sleeve 15 carried by the plate 10.

The maximum stroke of the pump, and consequently the maximum delivery thereof, may be varied by operating an adjusting lever 16. The actual delivery of the pump, from the maximum output determined by the adjustment of the lever 16 to a minimum output of substantially zero, is regulated automatically by regulating mechanism 17, in accordance with the demand upon the pump, as fully described in the patent referred to above.

Figure 8:
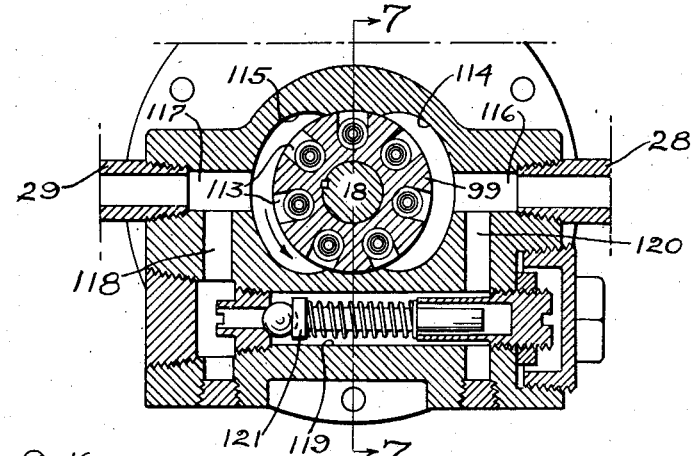
Fig. 8 is a transverse section on the line 8—8 of Fig. 7.
Figure 9:
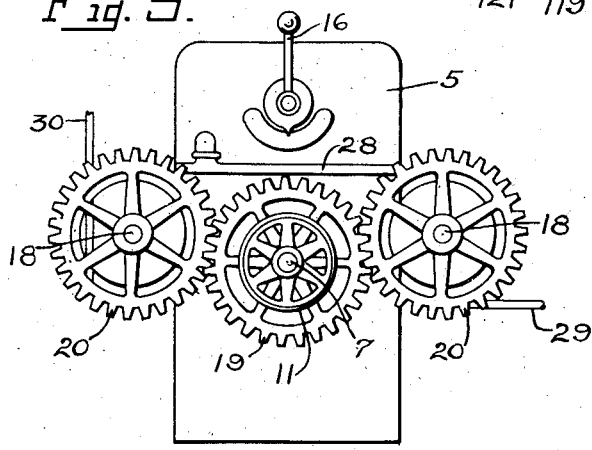
Fig. 9 is a front view of the pump unit showing the common drive for all of the pumps.

A variable displacement pump which may be employed as the secondary pumps 2 and 3 is illustrated in Figs. 7 and 8 and described hereinafter.

The secondary pumps 2 and 3 are shown attached to the front plate 10, so that the casing of each forms substantially a part of the casing 5, and the shaft 18 of each pump is connected, as by means of gears 19 and 20, to the driving shaft 7 to be driven thereby. The shaft 7 thus constitutes the drive for the entire pump unit.

The casing 5 contains a liquid, such as oil, which is supplied to the gear pump 4 through a suction pipe 21 and delivered thereby into a supply pipe 22. The pressure of the liquid in the pipe 22 is limited by a relief valve 23 which is connected thereto and discharges into the casing 5.

The main feed pump 1 is supplied with liquid by the gear pump 4 through a pipe 24 and a check valve 25 which are connected between the supply pipe 22 and an inlet port in the pintle 13. The liquid is then delivered by the pump 1 into a feed pipe 26 through an outlet port in the pintle 13, and the hydraulic pressure therein is limited by a relief valve 27 which is connected to the pipe 26 and discharges into the casing 5.

The secondary pumps 2 and 3 are supplied with liquid from the gear pump 4 through a supply pipe 28 which is connected to the main supply pipe 22, and the liquid is discharged by the pumps 2 and 3 into feed pipes 29 and 30, respectively.

The lathe shown diagrammatically in Fig. 1 has a headstock 31 for rotating a piece of work 32, a tool carriage 33 which is slidable longitudinally on the lathe to move a tool 34 into and out of engagement with the work 32, and cross slides 35 and 36 which are slidable transversely on the lathe for moving tools 37 and 38, respectively, into and out of engagement with the work 32.

The tool carriage 33 is advanced and retracted by a hydraulic motor 39 which has the rod 40 of its piston 41 connected to the carriage 33 and its cylinder 42 secured in a stationary position and supplied with liquid under pressure through pipes 43 and 44 which are connected, respectively, to the front and rear ends thereof. The other ends of the pipes 43 and 44 are connected, respectively, to annular ports 45 and 46 formed in the cylinder of a valve 47 which controls the flow of liquid to and from the motor 39.

The valve 47 is supplied with liquid from the gear pump 4 through a pipe 48 which is connected to the supply pipe 22 and to each end of the valve cylinder so that both ends of the valve are open at all times to gear pump pressure.

The valve 47 is supplied with liquid from the main pump 1 through the feed pipe 26 which is divided at its outer end into two branches and connected to two annular ports 49 and 50 in the valve cylinder. Liquid may be returned to the casing 5 from the valve 47 through an annular port 51 which is formed in the wall of the valve cylinder and connected by a drain pipe 52 to the casing 5.

When the plunger 53 of the valve 47 is in neutral position, as shown in Fig. 1, liquid from the main pump 1 flows through the pipe 26, the port 49, the port 51 and the drain pipe 52 back into the casing 5. The port 50 is open to the main pump pressure but the liquid which tends to enter this port exerts an equal force in opposite directions upon the adjacent pistons of the valve plunger 53, and the gear pump pressure exerts an equal force upon opposite ends of the plunger 53 so that the valve is hydraulically balanced, the plunger 53 being provided at its rear end with an auxiliary stem 54 having a cross-sectional area equal to that of its main or operating stem 55 which extends through the front end of the valve cylinder and has a handle 56 secured upon the outer end thereof.

The plunger 53 is urged rearwardly by a spring 57, which has one end fixed in a stationary position and its other end secured to an arm 58 carried by the stem 55, and is normally held in neutral position by a bell crank lever 59 which is pivoted intermediate its ends upon a stationary pin 60. One end of the lever 59 is connected by a link 61 to the arm 58 and the other end thereof is provided with a cam roller 62 which, when the valve plunger 53 is in neutral position as shown in Fig. 1, engages the inclined face 63 of a cam 64 carried by the tool carriage 33 and movable in unison therewith.

When the handle 56 is drawn forwardly to the limit of its movement, the valve plunger 53 is moved into forward rapid traverse position, as shown in Fig. 3, the lever 59 is swung upon its pin 60, and the roller 62 is moved away from the inclined face 63 of the cam 64.

Liquid will now be delivered by the main pump 1 through the pipe 26, the port 50, the cylinder of the valve 47, the port 46, and the pipe 44 to the rear end of the cylinder 42 to advance the piston 41. As the piston 41 moves forwardly, the liquid in the front part of the cylinder 42 will be bypassed through the pipe 43, the port 45, the cylinder of the valve 47, the port 49, the two branches of the pipe 26, the port 50, the cylinder of the valve 47, the port 46 and the pipe 44 to the rear end of the cylinder 42.

Both faces of the piston 41 are thus subjected to the same hydraulic pressure, but the effective area of the rear face is greater than that of the forward face due to the piston rod 40, and the piston advances upon the differential between the total forces exerted by the liquid upon the two faces of the piston. The pump 1, therefore, need supply to the rear end of the cylinder 42 only an amount of liquid equal to the displacement of the piston rod 40, consequently, the piston 41 and the tool carriage 33 advance at high speed.

As soon as the carriage 33 has advanced a short distance, the handle 56 may be released and the spring 57 will draw the cam roller 62 against a face 65 of a cam 66 connected to the carriage 33 and moved in unison therewith.

The cam face 65 is arranged parallel to the line of movement of the carriage 33 and is preferably of such a length that the roller 62 passes off from the rear end thereof and is drawn by the spring 57 against a face 67 on the cam 66 just before the tool 34 engages the work 32.

The cam face 67 is also arranged parallel to the line of movement of the carriage 33 and is of a length equal to the length or depth of the cut to be made by the tool 34.

When the roller 62 leaves the end of the cam face 65 and is drawn by the spring 57 against the cam face 67, the valve plunger 53 is moved from rapid traverse position, as shown in Fig. 3, into forward feeding position, as shown in Fig. 4, and liquid from the main pump 1 continues to flow into the rear end of the cylinder 42, as previously described.

However, the liquid in the forward part of the cylinder 42 is discharged through the pipe 43, the port 45, and the cylinder of the valve 47 into the pipe 48 against the pressure of the gear pump 4, and then discharged through the supply pipe 22 and the relief valve 23 into the casing 5.

As no liquid is bypassed at this time from the front end to the rear end of the cylinder 42, the piston 41 and the carriage 33 will be advanced at a predetermined feeding rate in accordance with adjustment of the pump 1.

The carriage 33 will continue to advance at the predetermined feeding rate until the cam roller 62 passes beyond the end of the face 67. The spring 57 then moves the roller 62 against a cam face 68, which is formed on the cam 64 and arranged parallel to the movement of the carriage 33, and also moves the plunger 53 to its rearmost or rapid reverse position, as shown in Fig. 5.

The port 45 is now in communication with the port 49 and the pipe 48 so that both the gear pump 4 and the main pump 1 may deliver liquid through the pipe 43 to the front end of the cylinder 42 and retract the piston 41 and the carriage 33 at high speed.

The liquid in the rear end of the cylinder 42 is discharged through the pipe 44, the port 46, the cylinder of the valve 47, the port 51, and the drain pipe 52 into the casing 5.

As the carriage 33 approaches the limit of its rearward movement, the cam face 63 engages the roller 62 and swings the lever 59 upon the pin 60, causing the same to move the valve plunger 53 forwardly against the action of the spring 57 until it is in neutral position, as shown in Fig. 1.

The cross slide 35 is advanced and retracted by a hydraulic motor 69 which has its piston 70 connected to the slide 35 and its cylinder 71 secured in a stationary position and supplied with liquid through pipes 72 and 73 which are connected, respectively, to the forward and rear ends thereof. The other ends of the pipes 72 and 73 are connected, respectively, to annular ports 74 and 75 formed in the cylinder of a valve 76 which controls the flow of liquid to and from the cylinder 71.

The cylinder of the valve 76 also has an annular port 77 which is connected to the feed pipe 30, an annular port 78 which is connected by a pipe 79 to the supply pipe 22, and an annular port 80 which is connected by a pipe 81 to the drain pipe 52. The ends of the valve cylinder are also connected to the drain pipe 52 for discharging liquid which may leak past the plunger 82.

When the lathe is idle, the port 77 is closed by the plunger 82 to prevent the pump 3 from delivering liquid to the valve cylinder and the port 74 is in communication with the port 78 so that the forward end of the cylinder 71 is open to gear pump pressure which acts upon the piston 70 to urge the same toward retracted position as shown in Fig. 1.

The plunger 82 carries a cam roller 83 upon its outer end for engagement with a cam 84 which is carried by the tool carriage 33. When the carriage 33 has moved forwardly a predetermined distance, an inclined face 85 on the cam 84 engages the roller 83 and forces the plunger 82 inwardly to the position shown in Fig. 6.

The port 75 is now in communication with the port 77 and the port 74 is in communication with the port 80 so that the pump 3 may deliver liquid to the rear end of the cylinder 71 to advance the piston 70 and the slide 35, and the liquid in the forward end of the cylinder 71 is discharged into the drain pipe 52 and returned thereby to the casing 5.

When the plunger 82 has reached the position shown in Fig. 6, the cam roller 83 moves onto a cam face 86 which is parallel to the line of movement of the carriage 33 so as to retain the plunger 82 in that position.

The cam face 85 may be so located in respect to the tool 34 as to move the tool 37 into engagement with the work 32 either before or after the tool 34 makes engagement therewith, and a cam 84 may be provided which will cause the tool 37 to be retracted either before, after, or simultaneously with the tool 34.

As shown, the cam face 86 prevents retraction of the tool 37 until after the tool 34 has been retracted to the position at which the tool 37 was advanced, at which time, the face 86 moves out of engagement with the roller 83 and the plunger 82 is moved forwardly along the cam face 85 to its initial position by a helical compression spring 87 which encircles the stem of the plunger 82 and is arranged between a stop 88 fixed thereon and the end of the valve 76.

The spring 87 moves the plunger 82 into the position shown in Fig. 1 and the port 74 is then in communication with the port 78 so that the gear pump 4 may deliver liquid to the forward end of the cylinder 71 to retract the piston 70 and the tool 37 at high speed, and the port 75 is in communication with the port 80 so that liquid may be discharged from the rear end of the cylinder 71 into the drain pipe 52.

The slide 36 and the tool 38 are advanced and retracted by a hydraulic motor 69ª which is the same as the motor 69 and controlled by a valve 76ª which is the same as the valve 76, and like parts have been indicated by like reference numerals.

The port 77 of valve 76ª is connected to the feed pipe 29 of pump 2 and the port 78 is connected to the supply pipe 22. When the lathe is idle, the port 77 is closed by the plunger 82 and the port 74 is in communication with the port 78 so that the forward end of the cylinder 71 is open to the gear pump pressure and the piston 70 is held in retracted position thereby, as shown in Fig. 1.

When the carriage 33 has advanced a predetermined distance, the cam roller 83 is engaged and the plunger 82 is moved rearwardly to the position shown in Fig. 6 by a cam 89 which is fixed for movement with the carriage 33. As the carriage 33 continues to advance, the roller 83 moves along a track 90 which is parallel to the line of movement of the carriage 33.

The port 75 is now in communication with the port 77 so that the pump 2 may deliver liquid to the rear end of the cylinder 71 to advance the piston 70 and the tool 38 at feeding speed, and the port 74 is in communication with the port 80 so that liquid may be discharged from the forward end of the cylinder 71 into the drain 52.

When the carriage 33 has advanced to a predetermined point, the roller 83 leaves the end of the track 90 and the plunger 82 is moved to its initial position by its spring 87, several positions of the roller 83 being indicated in dotted lines in Fig. 1.

The rear end of the cylinder 71 is now open to the drain and the forward end thereof is open to the supply pipe 22 so that the gear pump 4 may deliver liquid thereto and retract the piston 70 and the tool 38 at high speed, as previously described.

The tool 38 may thus be retracted before the tool 34 is retracted and the cam 89 is preferably pivoted at its outer end to the track 90 or to the carriage 33 so that it may be swung upon its pivot by the roller 83 as the carriage 33 moves rearwardly.

The gear pump 4 thus supercharges all three of the feed pumps and supplies liquid to all three motors for providing rapid traverse of the tool carriers.

The secondary feed pump shown in Figs. 7 and 8 is provided with a casing 92 having a flange 93 upon the rear end thereof which is attached to the front plate 10 of the casing 5 as by means of bolts 94.

The casing 92 has a cylindrical bore 95 extending therethrough and closed at its rear end by the front plate 10 and at its front end by a recessed cap 96 in the front wall of which the pump shaft 18 is supported by a bearing 97.

The pump is provided with a number of cylinders 98 which are arranged parallel to the shaft 18 and formed in a cylindrical cylinder block 99 which is fitted in the bore 95 and fixed upon the inner end of the shaft 18 as by means of a key 100 and a nut 101. The cylinder barrel is normally rotated by the shaft 18 in the direction of the arrow shown in Fig. 8.

Each of the cylinders 98 has a hollow piston 102 fitted therein and urged forwardly or outwardly by a helical compression spring 103 arranged therein and in the cylinder with its rear end in engagement with a bearing plate 104 arranged in the rear end of the cylinder.

The pistons 102 are reciprocated by a cam plate 105 which is arranged within the cap 96 at an angle to the axis of the pump and provided with a central opening 106 which is considerably larger than the shaft 18 to allow the same to pass freely therethrough.

The cam plate 105 has a circular body which is provided upon its periphery with a lug 107 and a lug 108 diametrically opposite each other. The lug 107 is pivoted upon a pin 109 carried by the casing 92, and the lug 108 is engaged by an adjusting screw 110 which is threaded through the cap 96 to adjust the slope of the cam plate relatively to the axis of the pump. The cam plate 105 is also preferably provided with an anti-friction thrust bearing 111, the inner ring 112 of which is in frictional engagement with the outer ends of the pistons 102 and rotates therewith.

The pin 109 and the adjusting screw 110 are preferably located between the intake side and the discharge side of the pump so that the springs 103 and the pistons 102 hold the lug 108 firmly in engagement with the adjusting screw 110 and thereby prevent the objectionable chattering which is prevalent in the prior pumps of this character.

By providing the antifriction bearing 111 and arranging its bearing ring 112 in frictional engagement with the ends of the pistons 102, the necessity of providing connecting rods between the pistons and the cam plate is avoided.

Each cylinder 98 is provided near its inner end with a port 113 which extends through the periphery of the cylinder barrel 99 and, as the cylinder barrel rotates, registers alternately with arcuate ports 114 and 115 which are formed diametrically opposite each other in the wall of the bore 95 and connected, respectively, to an inlet 116 and an outlet 117 formed in the casing 92. The pipes 28 and 29 are connected to the casing 92 in communication, respectively, with the inlet 116 and the outlet 117.

Whenever the pump develops a pressure in excess of a predetermined maximum, liquid is bypassed from the outlet 117 to the inlet 116 through a duct 118, a bore 119 and a duct 120 which are formed in the casing 92. The pressure at which liquid will be bypassed is regulated by a relief valve 121 which is arranged in the bore 119.

When the pistons are in the position shown in the drawings, the uppermost piston is at the limit of the intake stroke and the lowermost pistons are substantially at the limit of the discharge stroke.

As the cylinder barrel 99 rotates, the pistons on the intake side of the pump are retracted by the springs 103 and draw liquid through the ports 113 and 114 into the cylinders 98 until each cylinder arrives in its uppermost position at which time its port 113 has passed out of registry with the port 114 and the piston in that cylinder is at the limit of its intake stroke.

As soon as each cylinder passes from the uppermost position, its port 113 registers with the port 115 and the piston in that cylinder is gradually advanced by the cam plate 105 to expel liquid from that cylinder through the port 115 until the lowermost position is reached at which time the port 113 passes out of registry with the port 115. A continuous flow of liquid is thus produced.

The volume of liquid delivered by the pump may be varied by rotating the adjusting screw 110 to change the angularity of the cam plate 105 relatively to the axis of the pump and thereby vary the stroke of the pistons 102.

The invention herein set forth is susceptible of various modifications and adaptations without departing from the scope thereof as hereafter claimed.

The invention is hereby claimed as follows:

1. The combination, with a machine having a plurality of tool or work carriers, of a hydraulic feed for said machine comprising a hydraulic motor for operating each carrier, a feed pump for supplying liquid to each of said motors to advance the carrier controlled thereby at a predetermined feeding rate, a single auxiliary pump for supercharging all of said feed pumps and for supplying liquid to said motors to move said carriers faster than said feeding rate, and means for controlling the flow of liquid from the several pumps to said motors.

2. The combination, with a machine having a plurality of tool or work carriers, of a hydraulic feed for said machine comprising a hydraulic motor for operating each carrier, a feed pump for supplying liquid to each of said motors to advance the carrier controlled thereby at a predetermined feeding rate, a single auxiliary pump for supercharging all of said feed pumps and for supplying liquid to said motors to move said carriers faster than said feeding rate, means for controlling the flow of liquid from the several pumps to said motors, and a single drive for all of said pumps.

3. The combination, with a machine having a plurality of tool or work carriers, of a hydraulic feed for said machine comprising a hydraulic motor for operating each carrier, a feed pump for supplying liquid to each of said motors to advance the carrier controlled thereby at a predetermined feeding rate, a single auxiliary pump for supercharging all of said feed pumps and for supplying liquid to said motors to move said carriers faster than said feeding rate, means for controlling the flow of liquid from the several pumps to said motors, and a single housing supporting all of said pumps and containing liquid for supplying said pumps and to receive liquid discharged from said motors.

4. The combination, with a machine having a plurality of tool or work carriers, of a hydraulic feed for said machine comprising a hydraulic motor for operating each carrier, a plunger pump for supplying liquid to each of said motors to advance the carrier controlled thereby at a predetermined feeding rate, a single gear pump for supercharging all of said plunger pumps and for supplying liquid to said motors to move said carriers faster than said feeding rate, and means for controlling the flow of liquid from the several pumps to said motors.

5. The combination, with a machine having a plurality of tool or work carriers, of a hydraulic feed for said machine comprising a hydraulic motor for operating each carrier, a feed pump for supplying liquid to each of said motors to advance the carrier controlled thereby at a predetermined feeding rate, an auxiliary pump for supplying liquid to all of said feed pumps and to a motor to cause the same to move its carrier faster than said feeding rate, a valve for controlling the delivery of liquid to each of said motors, and means for operating each of said valves to cause said motors to advance said carriers predetermined distances and then retract the same to the initial positions thereof.

6. The combination, with a machine having a plurality of tool or work carriers, of a hydraulic feed for said machine comprising a hydraulic motor for operating each carrier, a feed pump for supplying liquid to each of said motors to advance the carrier controlled thereby at a predetermined feeding rate, a single auxiliary pump for supercharging all of said feed pumps and for supplying liquid to said motors to move said carriers faster than said feeding rate, a valve for controlling the delivery of liquid to each of said motors, and automatic means responsive to the movement of said carriers for operating said valves to cause said motors to advance said carriers predetermined distances at said feeding rates and then retract the same at high speed to the initial positions thereof.

7. The combination, with a machine having a plurality of tool or work carriers, of a hydraulic feed for said machine comprising a hydraulic motor for operating each carrier, a variable displacement pump for supplying liquid to each of said motors to advance the carrier controlled thereby at a predetermined feeding rate, a single gear pump for supercharging said variable displacement pumps and for supplying liquid to said motors to move said carriers faster than said feeding rates, a valve for controlling the delivery of liquid to each of said motors, and automatic means responsive to the movement of said carriers for operating said valves to direct liquid from said variable displacement pumps into said motors to cause the same to advance said carriers predetermined distances at predetermined feeding rates and then to direct liquid from said gear pump into said motors to cause the same to retract said carriers faster than said feeding rates.

8. The combination, with a machine having a plurality of tool or work carriers, of a hydraulic feed for said machine comprising a hydraulic motor for operating each carrier, a valve for controlling the flow of liquid to and from each motor, a pump housing, a main feed pump arranged in said housing and connected to one of said valves, secondary feed pumps carried by said housing and connected to the other valves, a gear pump arranged in said housing and connected to said feed pumps to supercharge the same and also connected to said valves, and means for operating said valves to direct liquid from said feed pumps into said motors to cause the same to advance said carriers predetermined distances at predetermined feeding rates and then direct liquid from said gear pump into said motors to cause the same to retract said carriers to the initial positions thereof at rates faster than said feeding rates.

9. The combination, with a plurality of hydraulic motors, of a pump unit comprising a casing, an equal number of feed pumps carried by said casing, means for connecting each of said feed pumps to one of said motors, an auxiliary pump carried by said casing and connected to all of said feed pumps to supercharge the same, and means for connecting said auxiliary pump to each of said motors.

10. The combination, with a plurality of hydraulic motors, of a pump unit comprising a casing, an equal number of variable displacement pumps carried by said casing, means for connecting each of said pumps to one of said motors, a gear pump carried by said casing and connected to all of said variable displacement pumps to supercharge the same, and means for connecting said gear pump to each of said motors.

11. The combination, with a plurality of hydraulic motors and a valve for controlling each of said motors, of a pump unit comprising a casing, an equal number of variable displacement pumps carried by said casing, means for connecting each of said pumps to one of said valves, a gear pump carried by said casing and connected to all of said variable displacement pumps to supercharge the same, means for connecting said gear pump to each of said valves, and a single drive for all of said pumps.

WALTER FERRIS.